United States Patent
Petrovic et al.

(10) Patent No.: US 12,418,197 B2
(45) Date of Patent: Sep. 16, 2025

(54) UNINTERRUPTIBLE POWER SUPPLY WITH INRUSH CURRENT PROTECTION AND METHODS OF USE THEREOF

(71) Applicant: SCHNEIDER ELECTRIC IT CORPORATION, Foxboro, MA (US)

(72) Inventors: Luka Petrovic, North Billerica, MA (US); Jing Huang, Andover, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 30 days.

(21) Appl. No.: 18/409,899

(22) Filed: Jan. 11, 2024

(65) Prior Publication Data

US 2025/0015628 A1  Jan. 9, 2025

Related U.S. Application Data (60) Provisional application No. 63/524,971, filed on Jul. 5, 2023.

(51) Int. Cl.
*H02J 9/06* (2006.01)
(52) U.S. Cl.
CPC .............. *H02J 9/068* (2020.01); *H02J 9/062* (2013.01)
(58) Field of Classification Search
CPC .................................. H02J 9/068; H02J 9/062
USPC .......................................................... 307/64
See application file for complete search history.

(56) References Cited

U.S. PATENT DOCUMENTS

| | | | | |
|---|---|---|---|---|
| 2006/0043792 A1* | 3/2006 | Hjort | ....................... | H02J 9/062 307/1 |
| 2008/0252144 A1* | 10/2008 | Wang | ....................... | H02J 9/062 307/66 |
| 2012/0181871 A1* | 7/2012 | Johansen | ................ | H02J 9/062 307/66 |
| 2024/0120769 A1* | 4/2024 | Kano | ........................ | H02J 9/06 |

OTHER PUBLICATIONS

Extended European Search Report from corresponding European Application No. 24184062.8 dated Dec. 6, 2024.

* cited by examiner

*Primary Examiner* — Michael R. Fin
(74) *Attorney, Agent, or Firm* — Lando & Anastasi, LLP (57) ABSTRACT

An uninterruptable power supply (UPS) is disclosed. The UPS includes an input configured to be coupled to a power source, a backup interface configured to be coupled to a backup power source, a backup interface configured to be coupled to a backup power source and to receive backup power from the backup power source, an output configured to be coupled to a load and to provide output power to the load, a bypass line coupled between the input and the output and configured to provide the input power to the output in a bypass mode of operation, an inverter coupled to the output and configured to provide the output power to the output derived from the input power in an online mode of operation, and a controller. Non-transitory computer readable medium for operating the controller and methods of providing output power to a load from a UPS are also disclosed.

27 Claims, 4 Drawing Sheets

UNINTERRUPTIBLE POWER SUPPLY WITH INRUSH CURRENT PROTECTION AND METHODS OF USE THEREOF

CROSS-REFERENCE TO RELATED APPLICATIONS

This application claims priority under 35 U.S.C. § 119 (e) to U.S. Provisional Application Ser. No. 63/524,971, titled "Silicon Controlled Rectifier Protection Control Algorithm During Turn on Procedure in UPS Inverter Application" filed Jul. 5, 2023, which is incorporated herein by reference in its entirety for all purposes.

SUMMARY

At least one example in accordance with the present disclosure relates generally to limiting inrush current during operation of an uninterruptible power supply. Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility, e.g., mains, source, and/or derived from a backup source of power, such as an energy storage device, e.g., a battery.

In accordance with an aspect, there is provided an uninterruptable power supply (UPS). The uninterruptable power supply may include an input configured to be coupled to a power source. The uninterruptable power supply may include an output configured to be coupled to a load and to provide output power to the load. The uninterruptable power supply further may include a bypass line coupled between the input and the output and configured to provide input power to the output in a bypass mode of operation. The uninterruptable power supply may include an inverter coupled to the output and configured to provide output power to the output in an online mode of operation. The uninterruptable power supply additionally may include a controller configured, during a transition from the bypass mode of operation to the online mode of operation. The controller may be configured to identify an input voltage of the input power. The controller may be configured to identify an inverter output voltage of the inverter. The controller further may be configured set an inverter reference voltage to a reference value responsive to a measured difference between the input voltage and the inverter output voltage.

In accordance with another aspect, there is provided an uninterruptable power supply. The uninterruptable power supply may include an input configured to be coupled to a power source and to receive input power from the power source. The uninterruptable power supply may include a backup interface configured to be coupled to a backup power source and to receive backup power from the backup power source. The uninterruptable power supply further may include an output configured to be coupled to a load and to provide output power to the load, the load rated to receive a nominal output voltage. The uninterruptable power supply may include a bypass line coupled between the input and the output and configured to provide the input power to the output in a bypass mode of operation. The uninterruptable power supply further may include an inverter coupled to the output and configured to provide the output power to the output derived from the input power in an online mode of operation. The uninterruptable power supply may include a controller to operate the uninterruptable power supply. During a transition from the bypass mode of operation to the online mode of operation, the controller may be configured to identify an input voltage of the input power. The controller may be configured to identify an inverter output voltage of the inverter. The controller further may be configured to determine a difference between the input voltage and the inverter output voltage. The controller may be additionally configured to set an inverter reference voltage to a reference value responsive to the measured difference between the input voltage and the inverter output voltage.

In some embodiments, the controller may be further configured to determine that the difference between the input voltage and the inverter output voltage is above a threshold level. The threshold voltage may have an about ±50 V range about its magnitude. In setting the inverter reference voltage to the reference value, the controller may be further configured to set the inverter reference voltage to the reference value having an absolute value that is greater than the threshold level when the difference between the input voltage and the inverter output voltage is above the threshold level. In some embodiments, an absolute value of the reference value is greater than the nominal output voltage.

In further embodiments, the controller may be configured to determine that the difference between the input voltage and the inverter output voltage is below a threshold level. The threshold voltage may have an about ±50 V range about its magnitude. In setting the inverter reference voltage to the reference value, the controller further may be configured to set the inverter reference voltage to the nominal output voltage when the difference between the input voltage and the inverter output voltage is below the threshold level.

In some embodiments, the bypass line may include a bypass line switch coupled between the input and the output. In specific embodiments, when transitioning from the bypass mode of operation to the online mode of operation, the controller further may be configured to operate the bypass line switch to open. In certain embodiments, the bypass line switch coupled between the input and the output may include at least one silicon controlled rectifier (SCR).

In further embodiments, the controller may be configured, in determining the difference between the input voltage and the inverter output voltage, to measure the difference between the input voltage and the inverter output voltage on a timescale of about 100 us to about 2 ms.

In further embodiments, the controller may be configured to update the inverter reference voltage to track the nominal output voltage when the inverter output voltage is within a threshold voltage of the input voltage.

In further embodiments, the controller may be configured to update the inverter reference voltage to track the input voltage for a period of time when the inverter output voltage is within a threshold voltage of the input voltage. The period of time may be between about 100 μs to about 700 μs.

In further embodiments, the controller may be configured to operate the inverter to provide output power to the output responsive to the set inverter reference voltage.

In accordance with another aspect, there is provided a non-transitory computer-readable medium storing thereon instructions for the operation of an uninterruptable power supply comprising an input configured to be coupled to a power source, an output configured to be coupled to a load, a bypass line coupled between the input and the output, an inverter coupled to the output, and a controller for controlling a transition from a bypass mode of operation to an online mode of operation. The stored instructions, when executed by at least one processor may instruct the at least one processor to receive a signal corresponding to an input voltage at the input. The stored instructions, when executed by at least one processor, may instruct the at least one processor to receive a signal corresponding to an inverter output voltage of the inverter. The stored instructions, when executed by at least one processor, further may instruct the at least one processor to determine a difference between the input voltage and the inverter output voltage. The stored instructions, when executed by at least one processor, additionally may instruct the at least one processor to set an inverter reference voltage to a reference value responsive to the measured difference between the input voltage and the inverter output voltage.

In further embodiments, the instructions for the operation of the uninterruptable power supply may instruct the at least one processor to determine if the difference between the input voltage and the inverter output voltage is above a threshold level.

In further embodiments, the instructions for the operation of the uninterruptable power supply may instruct the at least one processor to set the inverter reference voltage to the reference value that is greater than the threshold level when the difference between the input voltage and the inverter output voltage is above the threshold level.

In some embodiments, an absolute value of the first reference value may be greater than the nominal output voltage.

In further embodiments, the instructions for the operation of the uninterruptable power supply may instruct the at least one processor to determine that the difference between the input voltage and the inverter output voltage is below a threshold level.

In further embodiments, the instructions for the operation of the uninterruptable power supply may instruct the at least one processor to set the inverter reference voltage to the nominal output voltage when the difference between the input voltage and the inverter output voltage is below the threshold level.

In further embodiments, the instructions for the operation of the uninterruptable power supply may instruct the at least one processor to open a bypass switch on the bypass line that coupled between the input and the output.

In further embodiments, the instructions for the operation of the uninterruptable power supply may instruct the at least one processor to operate the inverter to provide output power to the output responsive to the set inverter reference voltage.

In accordance with another aspect, there is provided a method of providing output power to a load from an uninterruptable power supply comprising an input configured to be coupled to a power source, an output configured to be coupled to a load, a bypass line coupled between the input and the output, an inverter coupled to the output, and a controller for controlling a transition from a bypass mode of operation to an online mode of operation. The method may include identifying an input voltage at the input. The method may include identifying an inverter output voltage of the inverter. The method further may include determining a difference between the input voltage and the inverter output voltage. The method additionally may include setting an inverter reference voltage to a reference value responsive to the measured difference between the input voltage and the inverter output voltage.

In further embodiments, the method may include providing, with the inverter, output power to the output responsive to the set inverter reference voltage.

In further embodiments, the method may include determining if the difference between the input voltage and the inverter output voltage is above a threshold level.

In further embodiments, the method may include setting the inverter reference voltage to the reference value that greater than the threshold level when the difference between the input voltage and the inverter output voltage is above the threshold level.

In some embodiments, an absolute value of the first reference value is greater than the nominal output voltage.

In further embodiments, the method may include determining that the difference between the input voltage and the inverter output voltage is below a threshold level. In specific embodiments, the method may include setting the inverter reference voltage to the nominal output voltage when the difference between the input voltage and the inverter output voltage is below the threshold level.

In further embodiments, the method may include opening a bypass switch on the bypass line coupled between the input and the output.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

Examples of the systems and methods discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

DETAILED DESCRIPTION

Uninterruptible power supplies are commonly used to provide regulated, uninterrupted power to sensitive and/or critical loads, or any load to which a reliable source of power is desired. In some UPS systems, when the system faces a power outage or an input voltage at an unacceptable level, the UPS will switch from a bypass state to an online state over a short time scale, e.g., microseconds to milliseconds, to avoid dropping power to a load. A high-speed switch, such as a silicon-controlled rectifier (SCR) can be used to accelerate the state transition, i.e., from the bypass state to the online state. However, switches such as SCRs can be sensitive to spikes in voltage or current. Thus, to protect the SCR from such spikes, the SCR is preferably actuated when the voltage across it is low, e.g., almost zero. To achieve such operation, the voltage applied to the gate of the SCR, thereby controlling actuation of the SCR, must typically be controlled with high speed and precision to actuate the SCR at the appropriate time.

While some SCRs utilize digital signals due to their enhanced flexibility and functionality, the limited sampling rate of digital signals, when compared to analog signals, can limit the use of digital signals when high speed and precise switching of an SCR is desired. As such, some existing UPS systems utilize a hybrid approach that incorporates both digital and analog control into SCR-based state transitions, i.e., switching from the bypass state to the online state.

Figure 1:
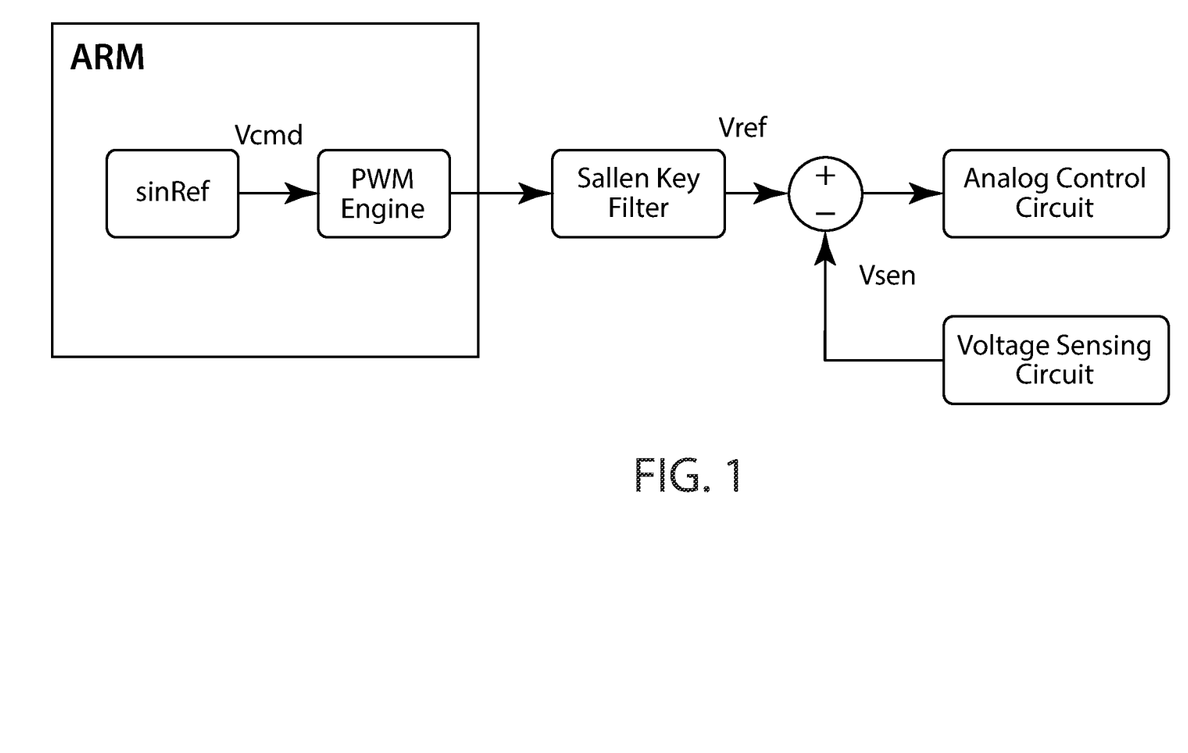
FIG. 1 is a schematic diagram of a hybrid control scheme, i.e., combined digital and analog control, for uninterruptible power supply (UPS), according to aspects of the invention.

For example, a conventional hybrid control schema is shown in FIG. 1. In the schema shown in FIG. 1, an ARM controller generates digital pulse width modulation (PWM) signals at discrete time intervals, the PWM signals being configured to control a UPS. As illustrated in FIG. 1, a Sallen-Key filter, i.e., a type of second order active filter, is used to convert the discrete PWM signals from the ARM controller into a continuous analog reference signal ($V_{ref}$). The continuous analog reference signal is directed to a comparator which compares the continuous analog reference signal to the output ($V_{sen}$) of an analog voltage sensing circuit that provides analog samples of the output from the DC/AC inverter of the UPS. The resulting comparison signal from the comparator is used to effectuate the state transition in the UPS via an analog control circuit.

However, when converting a digital PWM signal into a continuous analog reference signal, an unavoidable delay, e.g., in excess of 10 degrees of phase delay, in the corresponding hardware circuit, e.g., the Sallen-Key filter circuit or the like as illustrated in FIG. 1, can result. When the corresponding UPS is operating such that the output voltage is periodically stable, such a phase delay can be dealt with by proactively compensating the analog reference signal for the anticipated delay. However, when dealing with a sudden change, for example, a power outage or an input voltage at a sudden unacceptable level, the inherent delay at the interface between analog and digital control may result in an unacceptable delay in adjusting the analog reference signal to account for the sudden change in input voltage. Such a delay can result in a situation where, in response to detecting a power outage or unacceptable input voltage in a bypass mode, an inverter SCR (at the inverter output of a UPS) is turned on at a time where damage to the SCR is likely. For example, when a power outage or unacceptable input voltage is detected/sensed, if the inverter SCR is turned on before the inverter reference voltage is adjusted to account for the power outage or unacceptable input voltage, a relatively high voltage across the inverter SCR, resulting in a relatively high inrush current to the inverter SCR, can result potentially damaging the inverter SCR.

It is an object of the present disclosure to provide a digital control system incorporated into the controller of a UPS system that provides the instantaneous voltage control that overcomes long hardware-induced delays and provides precise control of the voltage across an SCR within a tolerance band before actuating the SCR for the state transition.

In accordance with an aspect, there is provided an uninterruptable power supply (UPS). The uninterruptable power supply includes an input configured to be coupled to a power source and to receive input power from the power source, a backup interface configured to be coupled to a backup power source and to receive backup power from the backup power source, and an output configured to be coupled to a load and to provide output power to the load, the load rated to receive a nominal output voltage. The uninterruptable power supply includes a bypass line coupled between the input and the output and configured to provide the input power to the output in a bypass mode of operation. The uninterruptable power supply further includes an inverter coupled to the output and configured to provide the output power to the output derived from the input power in an online mode of operation.

The uninterruptable power supply includes a controller that, inter alia, controls state transitions as disclosed herein. During a state transition from the bypass mode of operation to the online mode of operation, the controller is configured to identify an input voltage of the input power and identify an inverter output voltage of the inverter. The difference between the input voltage and the inverter output voltage is used to set an inverter reference voltage to a reference value. As disclosed herein, the reference value is generally a PWM signal that is converted to a continuous analog signal at the interface between analog and digital control. In general, the reference value is set such that it drives the inverter output voltage level to the input voltage level as quickly as possible. As disclosed herein, a substantial difference in voltage between the inverter output and the input can cause a large inrush current across an SCR switch in the inverter when the mode of operation of the UPS is switched from bypass mode to online mode. Applying a reference voltage to drive the inverter output voltage of the UPS to match the sensed input voltage as quickly as possible can serve to reduce this inrush current and preserve operation of the SCR switch in the inverter.

In accordance with an aspect, there is provided an uninterruptable power supply (UPS). The uninterruptable power supply includes an input configured to be coupled to a power source, e.g., configured to receive power from the power source. The uninterruptable power supply includes an output configured to be coupled to a load and to provide output power to the load, with the load rated to receive a nominal output voltage. The uninterruptable power supply further includes a bypass line coupled between the input and the output and configured to provide input power to the output in a bypass mode of operation, e.g., an output that does not require regulation. The uninterruptable power supply includes an inverter coupled to the output and configured to provide output power to the output in an online mode of operation. The uninterruptable power supply additionally includes a controller configured, during a transition from the bypass mode of operation to the online mode of operation, to identify an input voltage of the input power. The controller is further configured to identify an inverter output voltage of the inverter and to set an inverter reference voltage to a reference value responsive to a measured difference between the input voltage and the inverter output voltage.

Figure 2:
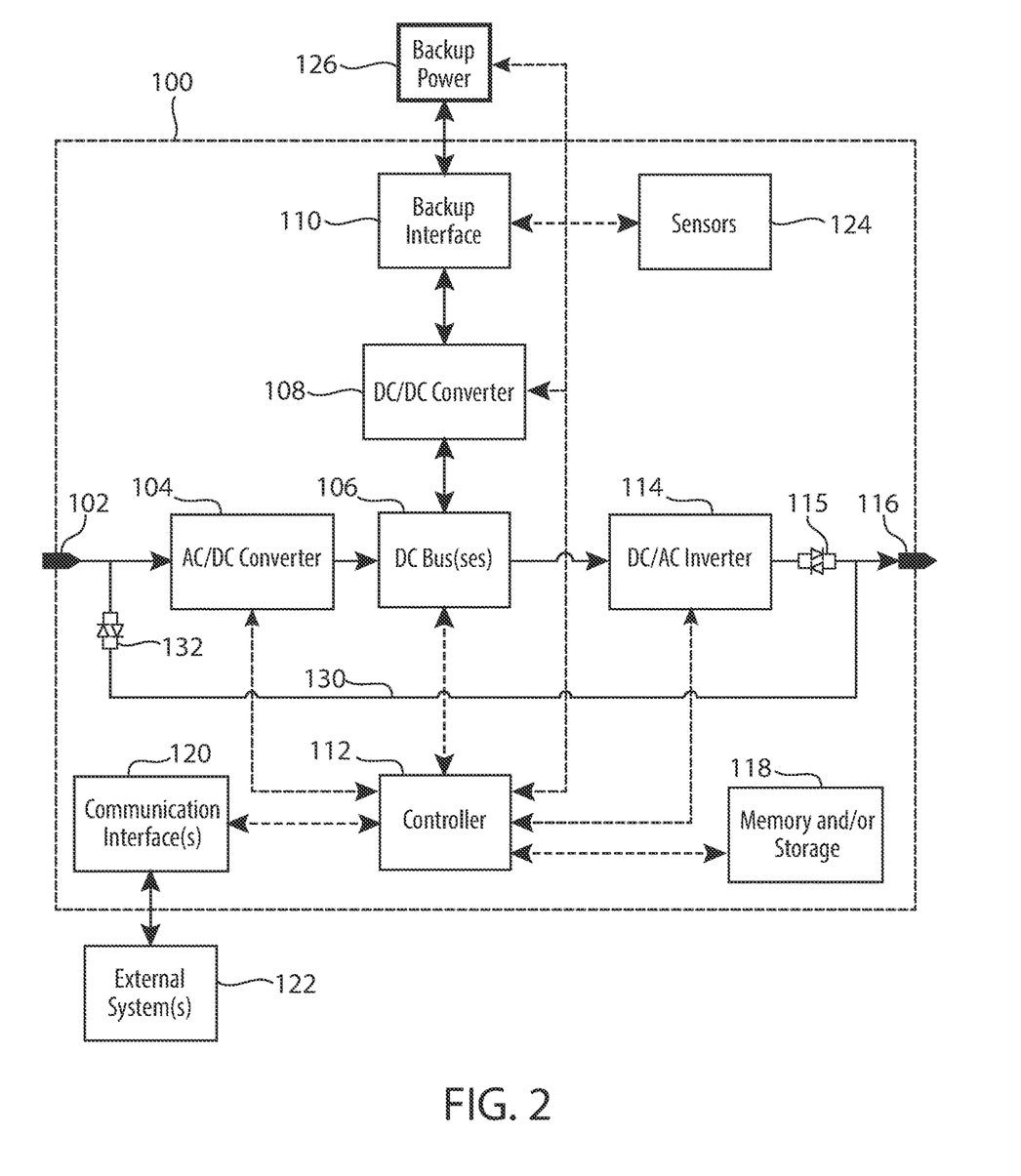
FIG. 2 is a block diagram of an example of a UPS, according to aspects of the invention.

FIG. 2 is a block diagram of a UPS 100 according to an example. The UPS 100 includes an input 102, an AC/DC converter 104, one or more DC busses 106, a DC/DC converter 108, a backup interface 110, at least one controller 112 ("controller 112"), a DC/AC inverter 114, an inverter switch 115, an output 116, a bypass line 130, a bypass line switch 132, a memory and/or storage 118, one or more communication interfaces 120 ("communication interfaces 120") which may be communicatively coupled to one or more external systems 122 ("external systems 122"), and one or more voltage sensors and/or current sensors 124 ("sensors 124"). The controller 112 controls the operation of the AC/DC converter 104, the inverter 1114, and various other components as discussed in more detail below, such as the inverter switch 115 and bypass switch 132.

The input 102 is coupled to the AC/DC converter 104 and to an AC power source (not pictured), such as an AC mains power supply. The AC/DC converter 104 is coupled to the input 102 and to the one or more DC busses 106 and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the backup interface 110 and is communicatively coupled to the controller 112. The backup interface 110 is coupled to the DC/DC converter 108 and is configured to be coupled to at least one backup power source 126, e.g., a battery, and/or another energy storage device. In some examples, the backup interface 110 is configured to be communicatively coupled to the controller 112.

In some examples, the UPS 100 may be external to the at least one source of backup power 126 and may be coupled to the at least one source of backup power 126 via the backup interface 110. In various examples, the UPS 100 may include one or more sources of backup power, which may include the at least one source of backup power 126. The at least one source of backup power 126 may include one or more batteries, capacitors, flywheels, or other sources of backup power in various examples.

The DC/AC inverter 114 is coupled to the one or more DC busses 106 and to the output 116 and is communicatively coupled to the controller 112. The output 116 is coupled to the DC/AC inverter 114, and to an external load (not pictured). The controller 112 is communicatively coupled to the AC/DC converter 104, the one or more DC busses 106, the DC/DC converter 108, the backup interface 110, the DC/AC inverter 114, the DC/AC inverter switch 115, the bypass line 130, the bypass line switch 132, the memory and/or storage 118, the communication interfaces 120, and/or the at least one energy storage device 126. The sensors 124 are communicatively coupled to the controller 112 and may be coupled to one or more other components of the UPS 100, such as the input 102, the AC/DC converter 104, the one or more DC busses 106, the DC/DC converter 108, the backup interface 110, the DC/AC inverter 114, the DC/AC inverter switch 115, the bypass line 130, the bypass line switch 132, and/or the output 116.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors, such as the sensors 124, configured to sense parameters of the input voltage. For example, the sensors 124 may include one or more voltage and/or current sensors coupled to the input 102 and being configured to sense information indicative of a voltage at the input 102 and provide the sensed information to the controller 112. In another example, the sensors 124 may include one or more voltage and/or current sensors coupled to the DC/AC inverter 114 and being configured to sense information indicative of an output voltage at the DC/AC inverter 114 and provide the sensed information to the controller 112.

When AC power provided to the input 102 is acceptable (for example, by having parameters, such as an input voltage value, that meet specified values, such as by falling within a range of acceptable input voltage values), the controller 112 controls components of the UPS 100 to operate in a normal, e.g., online, mode of operation. In the online mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the backup interface 110. The backup interface 110 receives the converted DC power, and provides the converted DC power to the at least one source of backup power 126 to charge the at least one source of backup power 126. The DC/AC inverter 114 receives DC power from the one or more DC busses 106, converts the DC power into regulated AC power, and provides the regulated AC power to the output 116 to be delivered to a load when inverter switch 115 is closed.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation. In the backup mode of operation, DC power is discharged from the at least one source of backup power 126 to the backup interface 110, and the backup interface 110 provides the discharged DC power to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

In some examples, the sensors 124 may include one or more sensors coupled to one or more of the foregoing components such that a voltage and/or current of one or more of the foregoing components may be determined by the controller 112. The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

In at least one embodiment, the controller 112 can operate the UPS 100 in a bypass mode of operation when AC power provided to the input 102 is at such a level that it can be provided directly to the output 116 without regulation. In the bypass mode of operation, the controller 112 operates the bypass switch 132 to close and the inverter switch 115 to open such that AC power at the input 102 is provided directly to the output 116 without regulation.

When transitioning from the bypass mode of operation to the online mode of operation, for example, when the controller determines that the AC power at the input 102 requires regulation, the bypass switch 132, e.g., bypass SCR, can have its gate signal removed and the inverter switch 115, e.g., inverter SCR, can have a gate signal applied. When a gate signal is applied to an inverter SCR 115, the inverter SCR 115 is closed and the inverter 114 can provide power to the output 116. However, when a gate signal is removed from a bypass SCR 132, the bypass SCR 132 will remain closed (i.e., will not open) until its anode current falls below its holding current value. As such, there exists a possibility during transition from the backup mode to the online mode of operation that both the input 102, via the bypass line 130, and the inverter 114 will be coupled to the output 116 at the same time.

In such situations, when the voltage at the input 102 rapidly changes outside of its nominal operating range, the same rapid voltage change is present on both the bypass line 130 and at the output 116. At the same time, the output of the DC/AC inverter 114 remains at a nominal level. As both the output of the DC/AC inverter 114 and the path including input 102, bypass line 130, and output 116 have large capacitances at different voltage potentials, if the inverter SCR 115 were to be actuated, the large voltage potential difference between the two capacitances could create a high inrush current which would flow from one capacitance to another trying to equalize voltages on the two capacitances. This large inrush current may damage the inverter SCR 115 if not adequately reduced. This inrush current is independent of the state of the bypass SCR 132, i.e., occurs regardless if the bypass SCR 132 is or is not conducting. It is noted that under these conditions, permitting the bypass SCR to conduct could increase the inrush current as it has a larger available input capacitance and it is a large current source.

Without wishing to be bound by any particular theory, the inrush current is proportional to the voltage difference between components, and thus, as described below, the controller 112 can adjust the DC/AC inverter 114 output voltage to reduce this voltage difference during a transition out of the bypass mode. This reduction in voltage difference can act to reduce the inrush current when inverter SCR 115 is closed.

During operation in bypass mode, the DC/AC inverter 114 outputs nominal output voltage in preparation for the UPS 100 being commanded into the online mode of operation. In such operation, the DC/AC inverter 114 output does not follow disturbances at the input. However, when transitioning from the bypass mode to the online mode, the controller 112 determines if there are differences in the input voltage and the inverter output voltage and can operate to reduce this difference, and limit inrush current, by setting the inverter reference voltage accordingly.

The potential issue of a large inrush current can be compounded by the potential delay, as discussed above, in converting a digital PWM signal into a continuous analog reference signal, resulting in a delay in generating an appropriate inverter reference voltage in response to identifying a difference in the input voltage and inverter output voltage that could result in a large inrush current.

Thus, as described herein, in a transition from the bypass mode of operation to the online mode of operation, a measured difference between the input voltage and the inverter output voltage is used to set the inverter reference voltage to match the inverter output voltage to the input voltage before the inverter SCR 115 is commanded to close. The inverter reference voltage is set at a reference level to which the output voltage of the inverter 114 is driven by the controller 112. In at least one embodiment, the inverter 114 is operated by the controller 112 with a hybrid control schema, as similarly discussed above with respect to FIG. 1, that drives the output of the inverter 114 to the inverter reference voltage by generating a continuous analog reference signal ($V_{ref}$) based on the inverter reference voltage.

Figure 3:
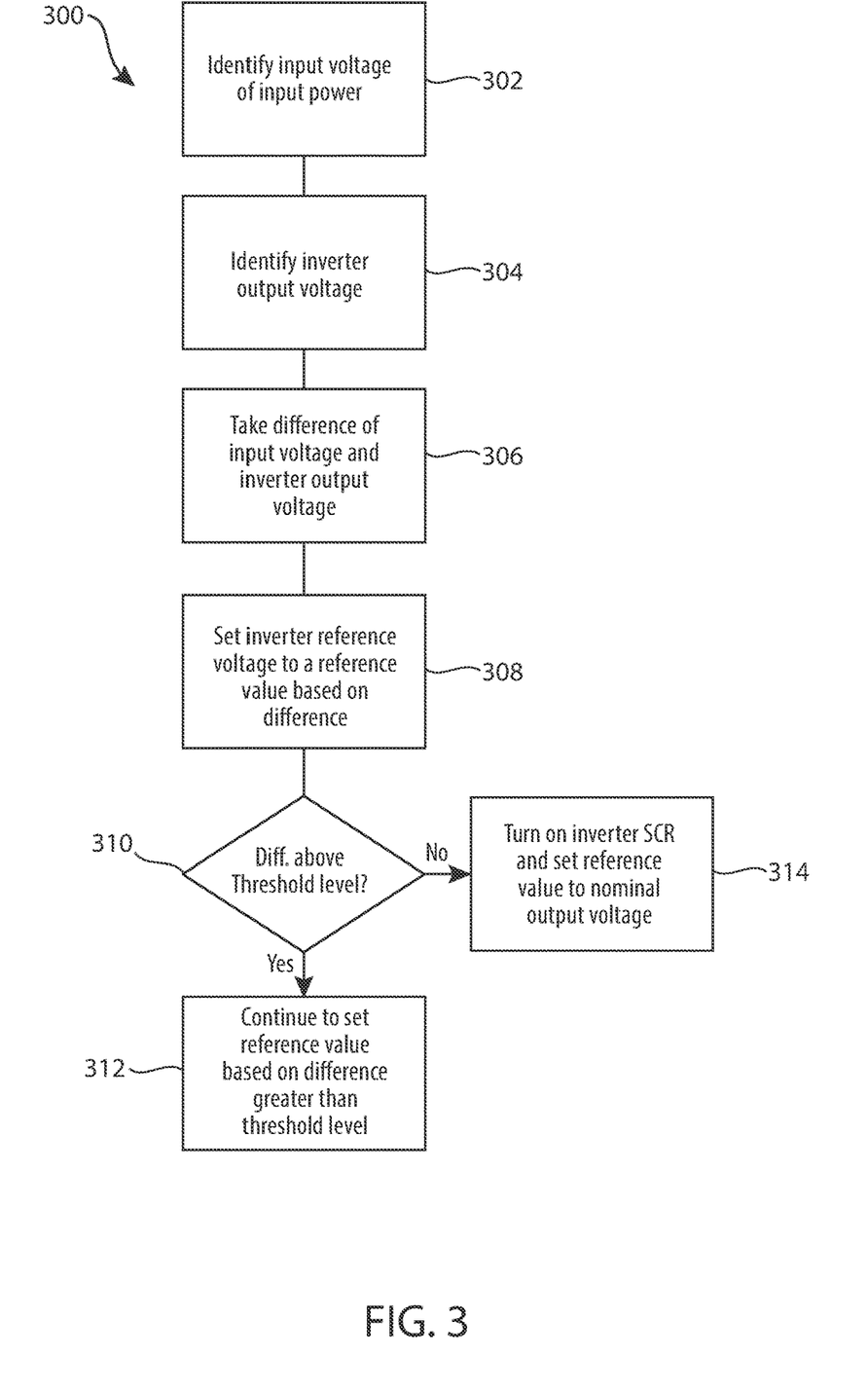
FIG. 3 is a flow chart of the operation of a controller including a switch protection control algorithm, according to aspects of the invention.

FIG. 3 illustrates a process for operating a UPS while transitioning from the backup mode of operation to the online mode of operation where the inverter reference voltage is set to match the inverter output voltage to the input voltage. In some examples, FIG. 3 illustrates at least part of the process used by the UPS 100 illustrated in FIG. 2 to control the transition between the bypass mode of operation and the online mode of operation.

At act 302, the controller identifies the magnitude of the input voltage of the input power at the input 102 and at act 304 the controller identifies the magnitude of the inverter output voltage of the inverter 114. The difference between these two magnitudes is measured at act 306 and is used, at act 308, to set the inverter reference voltage to a desired reference value. The controller has an established relatively low threshold value for what the difference between the input voltage and the inverter output voltage is to be for desired operation of the UPS when it transitions from the bypass mode of operation to the online mode of operation. At act 310, the difference between the input voltage and the inverter output voltage from act 306 is compared to the threshold value. If the difference between the input voltage and the inverter output voltage is above the threshold value, the controller sets or maintains the inverter reference voltage to a reference value having an absolute value that is greater than the threshold level at act 312. If the difference between the input voltage and the inverter output voltage is below the threshold level, the controller commands or turns on the inverter SCR and then the controller sets the inverter reference voltage to the nominal output voltage for online operation at act 314.

The controller is generally configured to determine that the difference between the input voltage and the inverter output voltage is above the threshold level or below the threshold level. In some embodiments, when the difference between the input voltage and the inverter output voltage is above the threshold level, the controller sets the inverter reference voltage to the reference value that has an absolute value that is greater than the threshold level. This absolute value of the reference value is typically greater than the nominal output voltage of the UPS, e.g., 120 VAC or 240 VAC. Alternatively, when the difference between the input voltage and the inverter output voltage is below the threshold level, the controller sets the inverter reference voltage to the nominal output voltage.

The threshold voltage has a range of about ±50V range about its magnitude, inclusive. For example, the threshold voltage may have a range of about 0V to about −50V about its magnitude, e.g., about 0V, about −1V, about −2V, about −3V, about −4V, about −5V, about −6V, about −7V, about −8V, about −9V, about −10V, about −11V, about −12V, about −13V, about −14V, about −15V, about −16V, about −17V, about −18V, about −19V, about −20V, about −21V, about −22V, about −23V, about −24V, about −25V, about −26V, about −27V, about −28V, about −29V, about −30V, about −31V, about −32V, about −33V, about −34V, about −35V, about −36V, about −37V, about −38V, about −39V, about −40V, about −41V, about −42V, about −43V, about −44V, about −45V, about −46V, about −47V, about −48V, about −49V, or about −50V. In some embodiments, the threshold voltage may have a range of 0V to +50V about its magnitude, e.g., about 0V, about +1V, about +2V, about +3V, about +4V, about +5V, about +6V, about +7V, about +8V, about +9V, about +10V, about +11V, about +12V, about +13V, about +14V, about +15V, about +16V, about +17V, about +18V, about +19V, about +20V, about +21V, about +22V, about +23V, about +24V, about +25V, about +26V, about +27V, about +28V, about +29V, about +30V, about +31V, about +32V, about +33V, about +34V, about +35V, about +36V, about +37V, about +38V, about +39V, about +40V, about +41V, about +42V, about +43V, about +44V, about +45V, about +46V, about +47V, about +48V, about +49V, or about +50V. In certain embodiments, the threshold voltage has a range of about ±30V range about its magnitude. As used herein, "about" when associated with the magnitude of a numerical variable refers to a value that is 20% up or down of the recited magnitude.

In some embodiments, the controller is further configured to measure the difference between the input voltage and the inverter output voltage on a timescale of about 100 us to about 2 ms. Within this timescale, e.g., about 100 us to about 2 ms, a possible, an inverter reference voltage signal is applied to match the inverter output voltage to the input voltage. Once the inverter output voltage is within a threshold voltage of the input voltage, the inverter reference voltage begins standard UPS operation, e.g., updating the inverter reference voltage, by tracking the nominal output voltage for online mode operation. As an optional step, once the inverter output voltage is within a threshold voltage of the input voltage, the, controller can permit the inverter reference voltage to track the input voltage for a period of time before beginning standard operation as disclosed herein. The period of time the inverter reference voltage tracks the input voltage is approximately the timescale for switching off the bypass switch and switching on the inverter switch as part of the transition from the bypass mode of operation to the online mode of operation. For example, the period of time the inverter reference voltage tracks the input voltage is between 100 us to about 700 µs, e.g., about 100 µs, about 125 µs, about 150 µs, about 175 µs, about 200 µs, about 225 µs, about 250 µs, about 275 µs, about 300 µs, about 325 µs, about 350 µs, about 375 µs, about 400 µs, about 425 µs, about 450 µs, about 475 µs, about 500 µs, about 525 µs, about 550 µs, about 575 µs, about 600 µs, about 625 µs, about 650 µs, about 675 µs, or about 700 µs.

Figure 4:
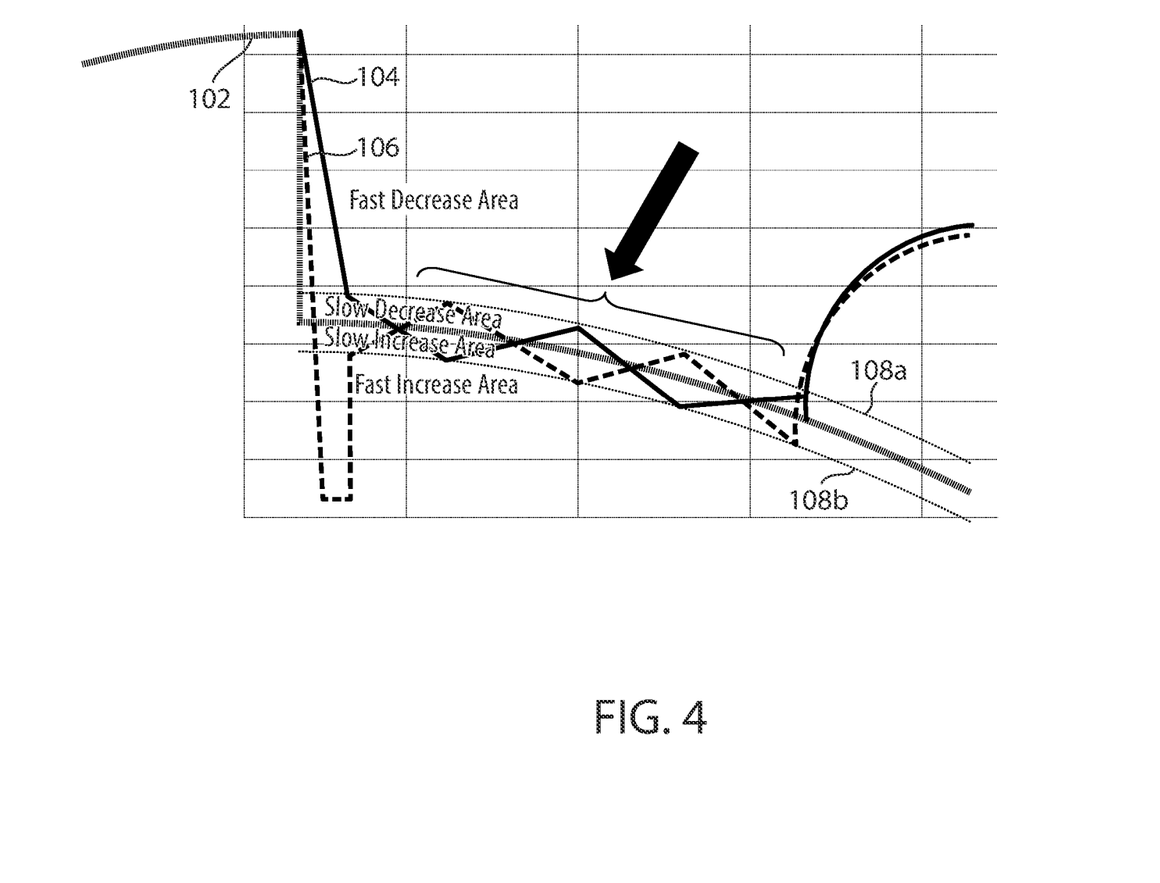
FIG. 4 is a plot of voltage versus time illustrating different regimes for reference voltage control during a transition from a bypass mode of operation to an online mode of operation.

An example of the SCR protection scheme as disclosed herein is illustrated in FIG. 4, showing voltages as a function of time during a state transition. In FIG. 4, the input voltage is represented by the gray line 102, the inverter output voltage is represented by the black line 104, and the inverter reference voltage is represented by the thick dashed line 106. The upper and lower thin dashed lines 108a, 108b represent the threshold level of the input voltage for standard UPS operation. In general, it is an object of the present disclosure that the inverter output voltage be matched to the input voltage rapidly to reduce the inrush current on the inverter switch when the bypass switch is commanded to open and the inverter switch is commanded to close. As illustrated in FIG. 4, if the voltage across the inverter switch, e.g., the inverter output voltage, is greater than the defined threshold, the controller will rapidly decrease the inverter output voltage with a corresponding rapid increase in the inverter reference voltage to compensate, i.e., the steep slopes of the black trace 104 and thick dashed trace 106 in FIG. 4. The inverter reference voltage can be a large positive or a large negative value, depending on how the voltage changes direction. Larger values for the reference voltage primarily guide the voltage change direction to be within the threshold level of the input voltage as rapidly as possible. Following the rapid application of the appropriate inverter reference voltage, dynamic values are written to the inverter reference voltage that are proportional to the difference between the threshold value and the actual value. Once the inverter output voltage is within the threshold of the input voltage, i.e., the inverter output voltage is within the thin dashed line brackets 108a, 108b about the gray trace 106 in FIG. 4, the controller commands or turns on the inverter SCR and then, when it is closed, the inverter reference voltage may begin standard UPS operation by tracking the nominal output voltage for online mode operation, shown as the curved black trace 104 and curved thick dashed trace 106 in FIG. 4.

As an optional step, as illustrated with the arrow and bracket in FIG. 4, once the inverter output voltage is within the threshold of the input voltage, the controller may initiate a tracking of the inverter reference voltage and the inverter output voltage for a time period defined by the time required to actuate the inverter switch, e.g., inverter SCR. This time period reduces the inrush current applied to the inverter switch lowering the probability of damage to the inverter switch when it is opened. Once the inverter switch is fully actuated, the inverter reference voltage begins standard UPS operation by tracking the required output voltage during online operation, again shown as the curved black trace 104 and curved thick dashed trace 106 in FIG. 4.

In accordance with an aspect, there is provided a non-transitory computer-readable medium storing thereon instructions for the operation of an uninterruptable power supply including an input configured to be coupled to a power source, an output configured to be coupled to a load, a bypass line coupled between the input and the output, an inverter coupled to the output, and a controller for controlling a transition from a bypass mode of operation to an online mode of operation. The stored instructions, when executed by at least one processor instruct the at least one processor to receive a signal corresponding to an input voltage at the input. The stored instructions, when executed by at least one processor, instruct the at least one processor to receive a signal corresponding to an inverter output voltage of the inverter. The stored instructions, when executed by at least one processor, further instruct the at least one processor to determine a difference between the input voltage and the inverter output voltage. The stored instructions, when executed by at least one processor, additionally instruct the at least one processor to set an inverter reference voltage to a reference value responsive to the measured difference between the input voltage and the inverter output voltage.

In further embodiments, the instructions for the operation of the uninterruptable power supply instruct the at least one processor to determine if the difference between the input voltage and the inverter output voltage is above a threshold level.

In further embodiments, the instructions for the operation of the uninterruptable power supply instruct the at least one processor to set the inverter reference voltage to the reference value that is greater than the threshold level when the difference between the input voltage and the inverter output voltage is above the threshold level. In some embodiments, an absolute value of the first reference value is greater than the nominal output voltage.

In further embodiments, the instructions for the operation of the uninterruptable power supply instruct the at least one processor to determine that the difference between the input voltage and the inverter output voltage is below a threshold level.

In further embodiments, the instructions for the operation of the uninterruptable power supply instruct the at least one processor to set the inverter reference voltage to the nominal output voltage when the difference between the input voltage and the inverter output voltage is below the threshold level.

In further embodiments, the instructions for the operation of the uninterruptable power supply instruct the at least one processor to open a bypass switch on the bypass line that coupled between the input and the output.

In further embodiments, the instructions for the operation of the uninterruptable power supply instruct the at least one processor to operate the inverter to provide output power to the output responsive to the set inverter reference voltage.

In accordance with an aspect, there is provided a method of providing output power to a load from an uninterruptable power supply including an input configured to be coupled to a power source, an output configured to be coupled to a load, a bypass line coupled between the input and the output, an inverter coupled to the output, and a controller for controlling a transition from a bypass mode of operation to an online mode of operation. The method includes identifying an input voltage at the input. The method includes identifying an inverter output voltage of the inverter. The method further includes determining a difference between the input voltage and the inverter output voltage. The method additionally includes setting an inverter reference voltage to a reference value responsive to the measured difference between the input voltage and the inverter output voltage.

In further embodiments, the method includes providing, with the inverter, output power to the output responsive to the set inverter reference voltage.

In further embodiments, the method includes determining if the difference between the input voltage and the inverter output voltage is above a threshold level.

In further embodiments, the method includes setting the inverter reference voltage to the reference value that greater than the threshold level when the difference between the input voltage and the inverter output voltage is above the threshold level. In some embodiments, an absolute value of the first reference value is greater than the nominal output voltage.

In further embodiments, the method includes determining that the difference between the input voltage and the inverter output voltage is below a threshold level. In specific embodiments, the method includes setting the inverter reference voltage to the nominal output voltage when the difference between the input voltage and the inverter output voltage is below the threshold level.

In further embodiments, the method includes opening a bypass switch on the bypass line coupled between the input and the output.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

Accordingly, the foregoing description and drawings are by way of example only.

What is claimed is:

1. An uninterruptable power supply, comprising:
   an input configured to be coupled to a power source and to receive input power from the power source;
   an output configured to be coupled to a load and to provide output power to the load, the load rated to receive a nominal output voltage;
   a bypass line coupled between the input and the output and configured to provide the input power to the output in a bypass mode of operation;
   an inverter coupled to the output and configured to provide output power to the output in an online mode of operation; and
   a controller configured, during a transition from the bypass mode of operation to the online mode of operation, to:
   identify an input voltage of the input power,
   identify an inverter output voltage of the inverter,
   set an inverter reference voltage to a reference value responsive to a measured difference between the input voltage and the inverter output voltage, and
   determine that the difference between the input voltage and the inverter output voltage is below a threshold level,
   wherein, in setting the inverter reference voltage to the reference value, the controller is further configured to set the inverter reference voltage to the nominal output voltage of the load when the difference between the input voltage and the inverter output voltage is below the threshold level.

2. The uninterruptible power supply of claim 1, wherein the controller is further configured to, prior to setting the inverter reference voltage, determine the difference between the input voltage and the inverter output voltage.

3. The uninterruptible power supply of claim 1, further comprising a backup interface configured to be coupled to a backup power source and to receive backup power from the backup power source.

4. The uninterruptible power supply of claim 1, wherein the controller is further configured to determine that the difference between the input voltage and the inverter output voltage is above a threshold level.

5. The uninterruptible power supply of claim 4, wherein, in setting the inverter reference voltage to the reference value, the controller is further configured to set the inverter reference voltage to the reference value having an absolute value that is greater than the threshold level when the difference between the input voltage and the inverter output voltage is above the threshold level.

6. The uninterruptible power supply of claim 4, wherein the threshold level has an about ±50 V range about its magnitude.

7. The uninterruptible power supply of claim 1, wherein an absolute value of the reference value is greater than the nominal output voltage of the load.

8. The uninterruptible power supply of claim 7, wherein in determining the difference between the input voltage and the inverter output voltage, the controller is further configured to measure the difference between the input voltage and the inverter output voltage on a timescale of about 400 μs to about 2 ms.

9. The uninterruptible power supply of claim 1, wherein the threshold level has an about ±50 V range about its magnitude.

10. The uninterruptible power supply of claim 1, wherein the bypass line includes a bypass line switch coupled between the input and the output, and in transitioning from the bypass mode of operation to the online mode of operation, the controller is further configured to operate the bypass line switch to open.

11. The uninterruptible power supply of claim 1, wherein the bypass line switch coupled between the input and the output comprises at least one silicon controlled rectifier (SCR).

12. The uninterruptible power supply of claim 1, wherein the controller is further configured to update the inverter reference voltage to track the nominal output voltage of the load when the inverter output voltage is within a threshold voltage of the input voltage.

13. The uninterruptible power supply of claim 1, wherein the controller is further configured to update the inverter reference voltage to track the input voltage for a period of time when the inverter output voltage is within a threshold voltage of the input voltage.

14. The uninterruptible power supply of claim 13, wherein the period of time is between 400 μs to about 700 μs.

15. The uninterruptable power supply of claim 1, wherein the controller is further configured to operate the inverter to provide output power to the output responsive to the set inverter reference voltage.

16. A non-transitory computer-readable medium storing thereon instructions for the operation of an uninterruptable power supply comprising an input configured to be coupled to a power source, an output configured to be coupled to a load, a bypass line coupled between the input and the output, an inverter coupled to the output, and a controller for controlling a transition from a bypass mode of operation to an online mode of operation, that, when executed by at least one processor, instruct the at least one processor to:
receive a signal corresponding to an input voltage at the input,
receive a signal corresponding to an inverter output voltage of the inverter,
determine a difference between the input voltage and the inverter output voltage,
determine that the difference between the input voltage and the inverter output voltage is
below a threshold level, and
set an inverter reference voltage to a reference value responsive to the measured difference between the input voltage and the inverter output voltage,
wherein the instructions for the operation of the uninterruptable power supply further instruct the at least one processor to set the set the inverter reference voltage to the nominal output voltage of the load when the difference between the input voltage and the inverter output voltage is below the threshold level.

17. The non-transitory computer-readable medium of claim 16, wherein the instructions for the operation of the uninterruptable power supply further instruct the at least one processor to determine if the difference between the input voltage and the inverter output voltage is above a threshold level.

18. The non-transitory computer-readable medium of claim 16, wherein the instructions for the operation of the uninterruptable power supply further instruct the at least one processor to set the inverter reference voltage to the reference value that is greater than the threshold level when the difference between the input voltage and the inverter output voltage is above the threshold level.

19. The non-transitory computer-readable medium of claim 16, wherein an absolute value of the reference value is greater than a nominal output voltage of the load.

20. The non-transitory computer-readable medium of claim 16, wherein the instructions for the operation of the uninterruptable power supply further instruct the at least one processor to open a bypass switch on the bypass line that coupled between the input and the output.

21. The non-transitory computer-readable medium of claim 16, wherein the instructions for the operation of the uninterruptable power supply further instruct the at least one processor to operate the inverter to provide output power to the output responsive to the set inverter reference voltage.

22. A method of providing output power to a load from an uninterruptable power supply comprising an input configured to be coupled to a power source, an output configured to be coupled to a load rated to receive a nominal output voltage, a bypass line coupled between the input and the output, an inverter coupled to the output, and a controller for controlling a transition from a bypass mode of operation to an online mode of operation, the method comprising:
identifying an input voltage at the input,
identifying an inverter output voltage of the inverter,
determining a difference between the input voltage and the inverter output voltage,
determining that the difference between the input voltage and the inverter output voltage
is below a threshold level, and
setting an inverter reference voltage to a reference value responsive to the measured difference between the input voltage and the inverter output voltage, wherein, in setting the inverter reference voltage to the reference value, the inverter reference voltage is set to the nominal output voltage of the load when the difference between the input voltage and the inverter output voltage is below the threshold level.

23. The method of claim 22, further comprising providing, with the inverter, output power to the output responsive to the set inverter reference voltage.

24. The method of claim 22, further comprising determining if the difference between the input voltage and the inverter output voltage is above a threshold level.

25. The method of claim 24, further comprising setting the inverter reference voltage to the reference value that is greater than the threshold level when the difference between the input voltage and the inverter output voltage is above the threshold level.

26. The method of claim 22, wherein an absolute value of the reference value is greater than a nominal output voltage of the load.

27. The method of claim 22, further comprising opening a bypass switch on the bypass line coupled between the input and the output.

* * * * *